United States Patent [19]

Kishimoto

[11] Patent Number: 5,171,111
[45] Date of Patent: Dec. 15, 1992

[54] DRILLING TOOL

[75] Inventor: Masato Kishimoto, Hirakata, Japan

[73] Assignee: Kansai Kogu Manufacturing Co., Ltd., Japan

[21] Appl. No.: 813,567

[22] Filed: Dec. 26, 1991

[30] Foreign Application Priority Data

Jul. 5, 1991 [JP] Japan .................................. 3-192484

[51] Int. Cl.⁵ ............................................... B23B 5/04
[52] U.S. Cl. ........................................ 408/67; 408/201; 408/204; 408/703
[58] Field of Search ...................... 408/201, 203-209, 408/703, 86, 68

[56] References Cited

U.S. PATENT DOCUMENTS 3,825,362  7/1974  Hougen ........................ 408/204 X
4,295,763  10/1981  Cunniff ............................. 408/86

OTHER PUBLICATIONS

Kansai Kogu Mfg. Co., Ltd., Hole Saw, (brochure), undated.

*Primary Examiner*—Steven C. Bishop
*Attorney, Agent, or Firm*—Sixbey, Friedman, Leedom & Ferguson

[57] ABSTRACT

A drilling tool comprises a holder unit adapted to be detachably mounted to a hand-held drive unit, and a hole saw unit detachably mounted to the holder unit, the hole saw unit including, as a unit, a cylindrical cutter and a center pin, the holder unit including, as a unit, a spring and a slider disposed to allow reciprocating motion of the center pin, whereby the drilling tool is able to constantly form an appropriate hole in a workpiece such as a thin iron plate, a thick iron plate, or a pipe having a round surface, and expandable components of the drilling tool are formed as a unit to allow for ready replacement.

4 Claims, 3 Drawing Sheets

DRILLING TOOL

FIELD OF THE INVENTION

The present invention relates to a drilling tool with a cylindrical cutter, referred to as a hole saw or a core drill.

BACKGROUND OF THE INVENTION

A conventional drilling tool or hole saw includes a cylindrical cutter to form a relatively large round hole in a workpiece such as an iron plate. The hole saw has a shank mounted to and driven by a hand-held drive unit such as an electric motor.

An operator holds the hand-held drive unit to press the cylindrical cutter against a workpiece during a drilling operation. However, it is not so easy to form a desired round hole accurately in a predetermined position. This is because a reaction force is created when the cylindrical cutter comes into contact with the workpiece while the cylindrical cutter is being rotated. This results in displacement of the cutter from the workpiece. Also, if the cylindrical cutter is not advanced in a direction perpendicular to the workpiece, then the resultant hole is ellipsoidal in shape, rather than round.

It is also well known to mount a drill centrally to a cylindrical cutter so that its proximal end extends beyond the cylindrical cutter. In the prior art, the drill is first inserted into a workpiece and serves as a guide. The cylindrical cutter is then moved toward the workpiece. This provides for accurate positioning of the tool and formation of a desired round hole.

If an iron plate as a workpiece is relatively thin, the conventional tool is able to form a desired hole while it is guided by the drill. However, the drill may adversely affect drilling operation if an iron plate as a workpiece is relatively thick.

When the both drill and the cylindrical cutter are operated to form holes in a thick workpiece, substantial resistance is applied to the drilling tool. This causes a hand-held drive unit to suffer from torque shortage. A substantial amount of time is thus required to complete a drilling operation.

An operator must press the drilling tool strongly against the workpiece to apply sufficient thrust to overcome such substantial resistance. This results in hard work and thus, fatigue of the operator. Also, the drill may readily be damaged or broken if the drilling tool is displaced while it is advanced into the thick workpiece.

Additionally, in the event that a selected workpiece has a curved surface, such as a pipe, it is difficult to immovably hold a hand-held drive unit during a drilling operation so as to prevent displacement of the drill in the direction in which the drilling tool is advanced. The drilling tool is inevitably swung and displaced to often cause breakage of the drill as mentioned above.

SUMMARY OF THE INVENTION

According to a first teaching of the present invention, there is provided a drilling tool which comprises: a holder unit adapted to be detachably mounted to a hand-held drive unit, and a hole saw unit detachably mounted to the holder unit, wherein the holder unit includes a holder section by which the hole saw unit is held, a cylindrical section extending from the holder section, a slider slidable axially within the cylindrical section, and a spring disposed to urge the slider toward the holder section, wherein the hole saw unit includes a cylindrical cutter having a mounting portion detachably held in the holder section, and a center pin slidably inserted into a central through hole of the mounting portion, and wherein the center pin has a distal end located beyond the cylindrical cutter, and a proximal end located in a face-to-face relation to the slider when the hole saw unit is mounted to the holder unit.

In the drilling tool according to the first teaching of the present invention, the center pin may be a drill or a positioning pin with no blade. Also, the drill and the positioning pin may be or may not be interchangeable.

According to a second teaching of the present invention, there is provided a drilling tool wherein the center pin constitutes a positioning pin. The positioning pin has a pointed end.

According to a third teaching of the present invention, there is provided a drilling tool wherein the center pin constitutes a drill. The drill has a shank slidably received in the central through hole of the mounting portion. Locking means is provided to non-slidably and non-rotatably secure the shank to the mounting portion.

According to a fourth teaching of the present invention, there is provided a drilling tool which comprises: a holder unit adapted to be detachably mounted to a drive unit, and a first hole saw unit and a second hole saw unit which are selectively mountable to the holder unit, wherein the holder unit includes a holder section by which the hole saw unit is detachably held, a cylindrical section extending from the holder section, a slider slidable axially within the cylindrical section, and a spring disposed to urge the slider toward the holder section, wherein each of the first hole saw unit and the second hole saw unit includes a cylindrical cutter having a mounting portion detachably held in the holder section, and a center pin slidably inserted into a central through hole of the mounting portion, wherein the center pin has a distal end beyond the cylindrical cutter, and a proximal end located in a face-to-face relation to the slider when each of said hole saw units is mounted to the holder unit, wherein the center pin of the first hole saw unit is formed as a drill, the drill including a shank slidably inserted into the central through hole of the mounting portion, and the first hole saw unit further including locking means for non-slidably and nonrotatably locking the shank of the drill, and wherein the center pin of the second hole saw unit is formed as a positioning pin including a pointed end.

According to the present invention, when an iron plate as a workpiece is relatively thin, the center drill of the drilling tool is operated in the same manner as a conventional tool. If the center drill may adversely affect drilling operation, the drill may be retreated in the cylindrical cutter so as not to effect drilling operation.

Also, according to the present invention, when a workpiece is a relatively thick iron plate or a workpiece is a pipe having a curved surface, the center drill does not perform its function and, in turn, acts as a positioning pin. In such a case, the center drill may be in the form of a reciprocating pin. In order to enable selective use of the drill and the positioning pin and to form expendable components rather than durable components as a unit to allow for easy replacement, the drilling unit of the present invention comprises a durable holder unit detachably mounted to a drive unit, and an expendable hole saw unit detachably mounted to the holder unit and including a cylindrical cutter and a center pin.

DESCRIPTION OF PREFERRED EMBODIMENTS

Preferred embodiments of the present invention will now be described with reference to the drawings.

Figure 1:
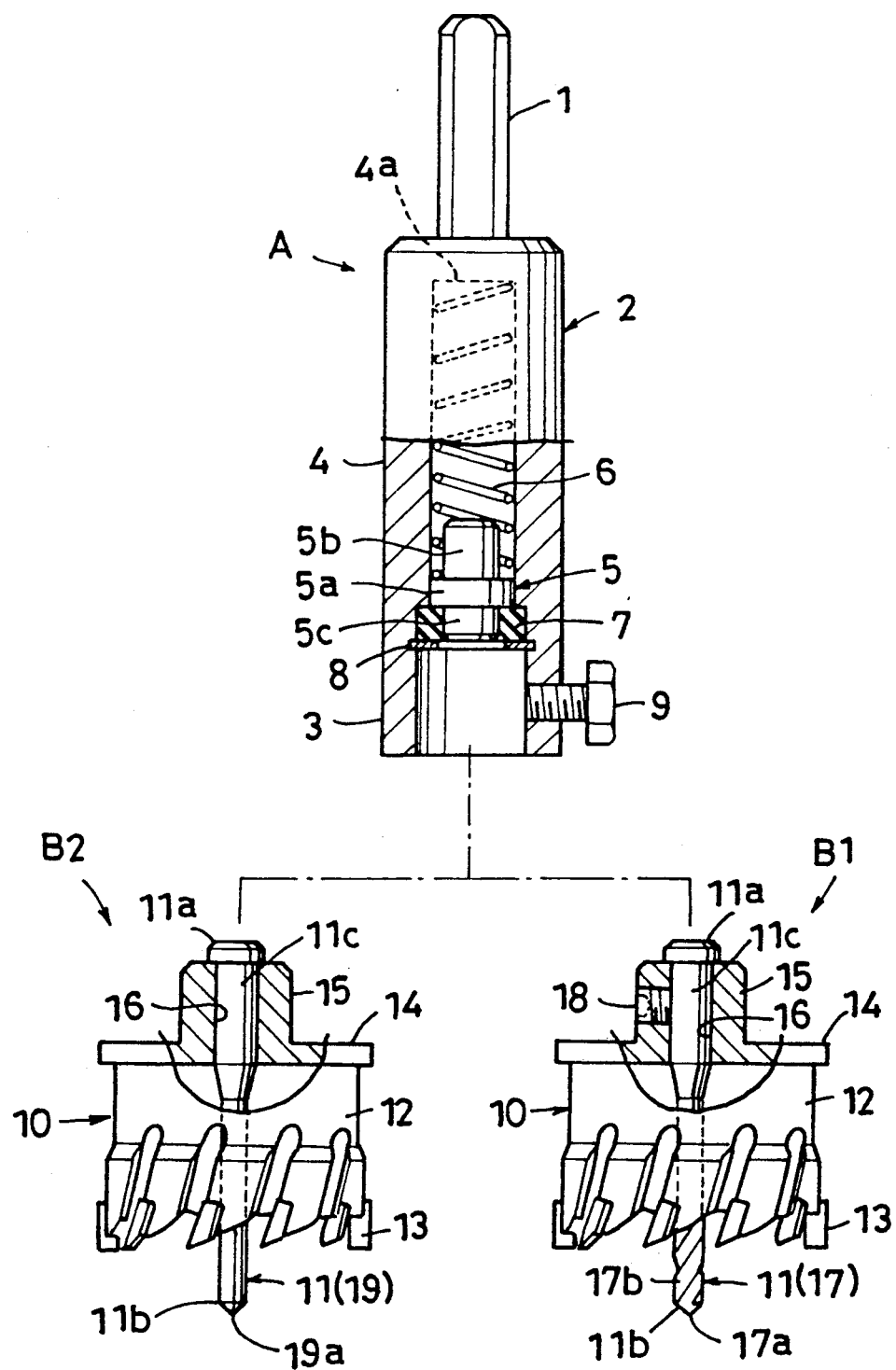
FIG. 1 is an exploded front view, partly in section, of a drilling tool according to one embodiment of the present invention.

Referring to FIG. 1, a drilling tool comprises a holder unit A detachably mounted to a hand-held drive unit, and a hole saw unit B detachably mounted to the holder unit A. There are illustrated two interchangeable hole saw units, namely, a first hole saw unit B1 and a second hole saw unit B2. The present invention may includes only one of these units, and the other unit is not essential.

The holder unit A includes a shank 1 adapted to be detachably mounted to a chuck of the drive unit, and a housing 2 extending from the shank 1. The housing 2 includes a cylindrical holder section 3 having an open end, and a cylindrical section 4 integrally connected to the holder section 3.

A slider 5 is slidably mounted in the cylindrical section 4. Also, a spring 6 such as a coil spring is disposed in the cylindrical section 4 to urge the slider 5 toward the holder section 3.

The slider 5 has a large diameter portion 5a slidably fitted in the cylindrical section 4, a small diameter spring receiving portion 5b projecting upwardly from the large diameter portion 5a, and a small diameter operating portion 5c projecting downwardly from the large diameter portion 5a.

The spring 6 has one end supported on the bottom 4a of the cylindrical section 4 and the other end positioned around the spring receiving portion 5b and supported on the large diameter portion 5a. The slider 5 is stopped by a stopper ring 7 which is located at a step portion between the holder section 3 and the cylindrical section 4. The stopper ring 7 is supported between the step portion and a snap ring 8. With the operating portion 5c inserted into the stopper ring 7 and exposed to the holder section 3, and the large diameter portion 5a contacted with and stopped by the stopper ring 7, the slider 5 is slidably moved into the cylindrical section 4 against the action of the spring 6.

A securing means 9 is movable radially of the holder section 3 and includes a bolt with a hexagonal head.

The hole saw unit B comprises a cylindrical cutter 10 and a center pin 11. The cylindrical cutter 10 has spaced blades 13 around an open edge thereof. A disk 14 is formed to close the upper end of a cylindrical portion 12 of the cutter 10. A mounting portion 15 extends centrally and upwardly from the disk 14. A central through hole 16 is coaxially formed through the mounting portion 15 and the disk 14. The mounting portion 15 is detachably inserted into the holder section 3 of the holder unit A. The mounting portion 15 is secured to the holder section 3 by tightening the securing means 9.

The center pin 11 is slidably inserted into the central through hole 16 and has a head 11a at its proximal end to engage the top of the mounting portion 15. The central pin 11 has a distal end 11b extending beyond the front end of the cylindrical cutter 10.

The first hole saw unit B1 and the second hole saw unit B2 both have the same structure of the hole saw unit B thus described, but are different from each other as follows.

Specifically, in the first hole saw unit B1, the center pin 11 has a chisel point 17a and a cutting edges 17b and constitutes a drill 17. The drill 17 has a shank 11c slidably received in the central through hole 16. The first hole saw unit B1 includes a locking means 18 to non-slidably and non-rotatably lock the shank 11c. The locking means 18 comprises an internally threaded hole formed radially in the mounting portion 15, and a bolt having a head with a hexagonal concave. The bolt is threaded into the internally threaded hole to secure the shank 11c of the drill 17 to the mounting portion 15. If the bolt is loosened or removed, the drill 17 is free to slide and rotate in the central through hole 16.

The second hole saw unit B2 constitutes the center pin 11 as a positioning pin 19, in stead, of the drill, and has a pointed end 19a extending beyond the front end of the cylindrical cutter 10.

With this arrangement, the mounting portion 15 is inserted into the holder section 3 of the holder unit A and held in position by the securing means 9 to mount the first hole saw unit B1 or the second hole saw unit B2. That is, the first hole saw unit B1 and the second hole saw unit B2 are selectively mounted to the holder section 3 of the single holder unit A.

Also, the drill 17 and the positioning pin 19 may selectively be used in either the first hole saw unit B1 or the second hole saw unit B2. For example, the tool only employs the first hole saw unit B1, and the drill 17 and the positioning pin 19 are selectively used and incorporated into the cylindrical cutter 10 of the unit B1.

Operation of the present invention thus described by way of example is as follows.

Figure 2:
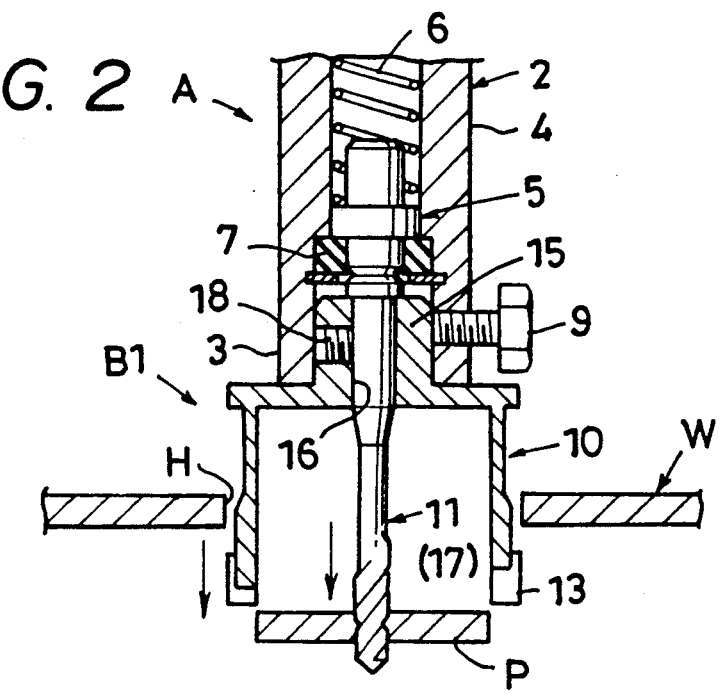
FIG. 2 is a vertical sectional view of the drilling tool in use according to the present invention, with a first hole saw unit mounted to a holder unit, and a drill secured to a mounting portion of a cylindrical cutter.
Figure 3:
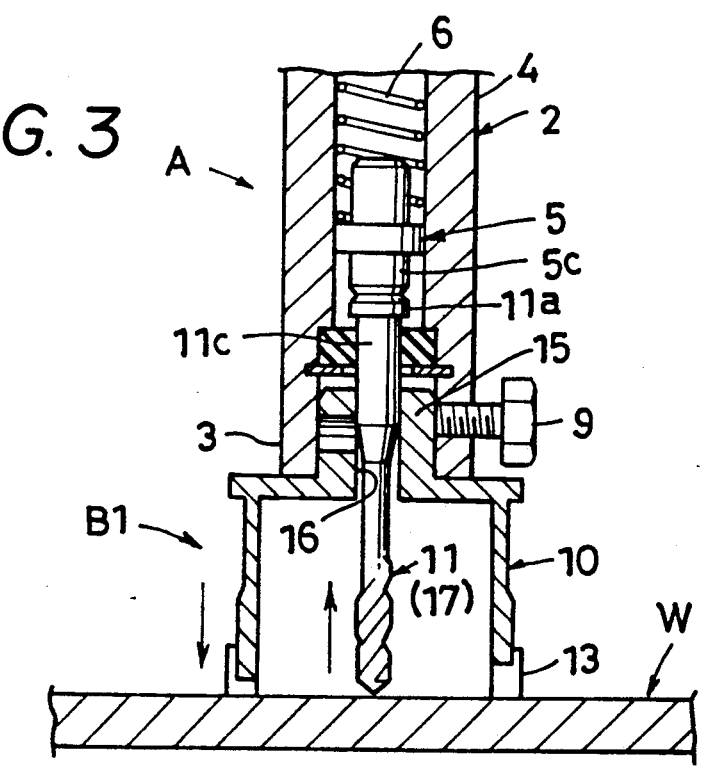
FIG. 3 is a vertical sectional view of the drilling tool in use according to the present invention, with the first hole saw unit mounted to the holder unit, and the drill slidably mounted to the mounting portion of the cylindrical cutter.

FIGS. 2 and 3 illustrate the operation of the first hole saw unit B1 mounted to the holder unit A. Although not shown, the shank 1 of the holder unit A is held by the chuck of a hand-held drive unit and rotated thereby. The mounting portion 15 of the hole saw unit B1 is inserted into the holder section 3 of the holder unit A. The securing means 9 is tightened to secure the hole saw unit B1 to the holder section 3.

FIG. 2 shows the manner in which a hole is formed in a relatively thin workpiece W, for example, iron plate having a thickness of less than 4 mm, by the drilling tool of the present invention. In this case, the shank 11c of the drill 17 is inserted into the central through hole 16 and fixed in position by the locking means 18. The drive unit provides a drive force to rotate the holder unit A and the hole saw unit B1 together. This causes the holder unit A and the hole saw unit B1 to rotate together. When an operator holds the drive unit to press the hole saw unit B1 against the workpiece W, then the chisel point 17a of the drill 17 is inserted into the workpiece W and acts as a positioner to form a hole in the workpiece. The blades 13 of the cylindrical cutter 10 is subsequently inserted into the workpiece W to form a hole H. A drilled piece P is removed with the drill 17 from the hole H. In this example, the drill 17 is operated completely in the same manner as a conventional hole saw with an associated drill as described above, since the drill 17 is non-slidably and non-rotatably secured to the mounting portion 15 by the locking means 18.

FIG. 3 shows the manner in which a hole is formed in a relatively thick workpiece W, for example, an iron plate having a thickness of greater than 4 mm, or a workpiece with a round surface such as a steel pipe. In this case, the locking means 18 is loosened or removed to allow the shank 11c of the drill 17 to slide in the central through hole 16. When the operator holds the drive unit to press the hole saw unit B1 against the workpiece W, then the chisel point 17a of the drill 17 acts as a positioner to form a hole in the workpiece W. However, when the drive unit is advanced toward the workpiece W, the head 11a of the drill 17 is retreated with the slider 5. Specifically, the drill 17 is not rotated with the cylindrical cutter 10, but slides in the central through hole 16 to allow the head 11a to push up the slider 5 against the action of the spring 6. This causes the distal end 11b of the drill 17 to retreat into the cylindrical cutter 10. While the drill 17 is kept away from being inserted into the workpiece W, the blades 13 of the cylindrical cutter 10 continues to advance in order to form a hole. With this arrangement, when a hole is formed in a thick workpiece W, the drilling tool is subject to cutting resistance only by the cylindrical cutter 10, rather than both by a drill and a cylindrical cutter as in a conventional hole saw. Thus, the drive unit is free from torque shortage, and the drilling tool is able to quickly form a hole. According to tests carried out by the inventor of the present invention, the drilling tool, in this example, was able to quickly form holes in an iron plate having a thickness of 12 mm without any difficulty. Even if the drive unit is vibrated during a drilling operation, the drill 17 is free from breakage unlike a conventional drill. By the same token, if an operator's hand by which the drive unit is held is vibrated to cause swinging motion of the drilling tool while a hole is being formed in a round workpiece W or a pipe, the drill 17 is free from breakage.

Figure 4:
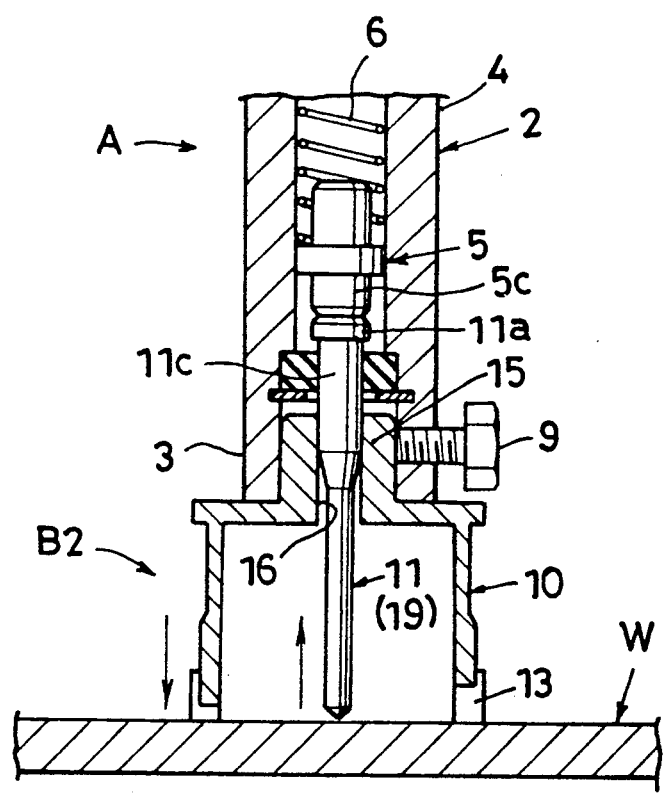
FIG. 4 is a vertical sectional view of the drilling tool in use according to the present invention, with a second hole saw unit mounted to the holder unit.

FIG. 4 illustrates the operation of the second hole saw unit B2 mounted to the hole saw unit A. As in the foregoing example, the shank 1 of the holer unit A is held by the chuck of a hand-held drive unit and driven for rotation thereby. The mounting portion 15 of the hole saw unit B2 is inserted into the holder section 3 of the holder unit A and secured to the holder section 3 upon tightening of the securing means 9.

In this example, a hole can be formed in any workpiece W such as a thin iron plate, a thick iron plate, or a pipe. When the operator holds the drive unit to press the hole saw unit B2 against the workpiece W, the pointed end 19a of the positioning pin 19 is brought into contact with the workpiece W and acts as a positioner to drill a hole. The drive unit is then advanced to slide the positioning pin 19 in the central through hole 16. This causes the head 11a to push up the slider 5 against the action of the spring 6. The distal end 11b of the positioning pin 19 is then retreated in the cylindrical cutter 10. On the other hand, the blades 13 of the cylindrical cutter 10 is advanced to form a hole in the workpiece W. As in the example shown in FIG. 3, the drilling tool is subject to cutting resistance only by the cylindrical cutter 10 during the drilling operation. The drive unit is thus free from torque shortage, and the drilling tool is able to quickly form a hole.

Although not shown, the positioning pin 19 may be incorporated into the first hole saw unit B1. In such a case, the locking means 18 of the mounting portion 15 is loosened or removed, and the positioning pin 19 is slidably inserted into the central through hole 16. This alternative arrangement is used and operated in the same manner as that shown in FIG. 4 so as to form a hole.

In any of the foregoing embodiments, the hole saw unit B is subject to wear and fatigue while drilling operation is repeatedly performed. The blades 13 of the cylindrical cutter 10 may be sharpened after becoming abraded, but their useful life is terminated after repeated use. This is also the case with the chisel point 17a and the cutting edges 17b of the drill 17 as well as the pointed end 19a of the positioning pin 19a. The hole saw unit B must then be replaced. According to the present invention, a used hole saw unit B is replaced with a new one, but the holder unit A continues to be usable. The drilling tool is thus economical and can be used for a considerable period of time.

EFFECT OF THE INVENTION

According to the present invention, the center pin 11, i.e., the drill 17 or the positioning pin 19, can be moved away from the workpiece W as it pushes up the slider 5. This prevents excessive cutting resistance during a drilling operation and enables the tool to quickly form a hole with the use of a hand-held drive unit. A particular feature of the present invention is that the cylindrical cutter 10 and the center pin 11 as expendable components are formed as a unit, that is, the hole saw unit B. The holder unit A is a durable component and can be used for a considerable period of time. Thus, each of these expendable components is replaced with the new one when its useful life is terminated. The drilling tool of the present invention is thus economical. This replacement is quite simple and only requires mounting of the mounting portion 15 of the hole saw unit B to the holder section 3 of the holder unit A. When the hole saw unit B is newly mounted, the center pin 11 is automatically brought into contact with the slider 5 to ensure reciprocating motion of the center pin 11.

Also, according to the present invention, the locking means 18 is operable to lock and unlock the center pin 11. This provides for two different modes of operation. Specifically, when the drill 17 is locked by locking means 18, then the center pin 11 (drill 17) acts as a drill and is operated in the same manner as a conventional hole saw unit with a drill. On the other hand, when the drill 17 is unlocked by the locking means 18 and thus no longer acts as a drill, then the center pin 11 (drill 17) acts as a positioning pin and is operated in a manner to achieve the objects of the present invention. A desired mode of operation is advantageously selected in accordance with types of workpieces such as thin iron plate, a thick iron plate or a pipe of a round surface.

What is claimed is:

1. A drilling tool comprising a holder unit (A) adapted to be detachably mounted to a drive unit, and a hole saw unit (B) detachably mounted to said holder unit, said holder unit (A) including a holder section (3) detachably holding said hole saw unit, a cylindrical section (4) extending from said holder section (3), a slider (5) slidable axially within said cylindrical section (4), and a spring (6) disposed to urge said slider (5) toward said holder section (3), said hole saw unit (B) including a cylindrical cutter (10) having a mounting portion (15) detachably held in said holder section (3) and including a central through hole (16), and a center pin (11) slidably inserted into said central through hole (16), said center pin (11) having a proximal end (11a) and a distal end (11b), said distal end (11b) extending beyond said cylindrical cutter, and said proximal end (11a) being located in a face-to-face relation to said slider (5) when said hole saw unit (B) is mounted to said holder unit (A).

2. A drilling tool according to claim 1, wherein said center pin (11) is a positioning pin (19) having a pointed end (19a) on the distal end (11b).

3. A drilling tool according to claim 1, wherein said center pin (11) is a drill (17) including a shank (11c) slidably inserted into said central through hole (16) of said mounting portion (15), further the hole saw unit (B) comprises locking means (18) for locking said shank (11c) of said drill (17) to the mounting portion (15), whereby said drill (17) may be locked to prevent its sliding and rotary motion or unlocked to allow its sliding and rotary motion in the central through hole (16).

4. A drilling tool comprising a holder unit (A) adapted to be detachably mounted to a drive unit, and a first hole saw unit (B1) and a second hole saw unit (B2) selectively mountable to said holder unit, said holder unit (A) including a holder section (3) detachably holding one of the hole saw units (B1) and (B2) selectively, a cylindrical section (4) extending from said holder section (3), a slider (5) slidable axially within said cylindrical section (4), and a spring (6) disposed to urge said slider (5) toward said holder section (3), each of said first hole saw unit (B1) and said second hole saw unit (B2) including a cylindrical cutter (10) having a mounting portion (15) detachably held in said holder section (3) and including a central through hole (16), and a center pin (11) slidably inserted into said central through hole (16), said center pin (11) having a proximal end (11a) and a distal end (11b), said distal end (11b) extending beyond said cylindrical cutter, and said proximal end (11a) being located in a face-to-face relation to said slider (5) when each of said first hole saw unit (B1) and said second hole saw unit (B2) is mounted to said holder unit (A), said center pin (11) of said first hole saw unit (B1) being a drill (17) having a shank (11c) slidably inserted into said central through hole (16) of said mounting portion (15), said first hole saw unit (B1) further including locking means (18) for non-slidably and non-rotatably locking said shank (11c) of said drill (17), said center pin (11) of said second hole saw unit (B2) being a positioning pin (19) having a pointed end (19a).

* * * * *